(12) United States Patent
Faulkner et al.

(10) Patent No.: US 7,216,003 B2
(45) Date of Patent: May 8, 2007

(54) HI-ACCURACY THREE-DIMENSIONAL TOPOGRAPHIC MODELING APPARATUS

(75) Inventors: Lawrence Q. Faulkner, Fillmore, CA (US); Mark E. Fisher, Moorpark, CA (US); Justin Luton, Simi Valley, CA (US)

(73) Assignee: Solid Terrain Modeling, Filmore, CA (US)

(*) Notice: Subject to any disclaimer, the term of this patent is extended or adjusted under 35 U.S.C. 154(b) by 807 days.

(21) Appl. No.: 09/958,207

(22) PCT Filed: Apr. 6, 2001

(86) PCT No.: PCT/US01/11188

§ 371 (c)(1),
(2), (4) Date: Oct. 5, 2001

(87) PCT Pub. No.: WO01/77987

PCT Pub. Date: Oct. 18, 2001

(65) Prior Publication Data

US 2002/0161469 A1 Oct. 31, 2002

Related U.S. Application Data

(60) Provisional application No. 60/195,130, filed on Apr. 6, 2000.

(51) Int. Cl.
*G05B 11/01* (2006.01)
*G06F 19/00* (2006.01)
*B44C 3/12* (2006.01)

(52) U.S. Cl. ............... 700/26; 700/118; 700/98; 700/187; 702/5; 156/63

(58) Field of Classification Search ............ 434/150, 434/152; 702/5; 703/1, 2; 706/919; 345/419, 345/420, 964; 700/26, 98, 118, 160, 161, 700/ 164, 172, 182, 187, 191, 163, 194, 195, 251, 700/253, 258, 259; 156/63
See application file for complete search history.

(56) References Cited

U.S. PATENT DOCUMENTS 3,994,615 A * 11/1976 Narang ............... 408/226
4,514,674 A * 4/1985 Hollis, Jr. et al. ......... 318/687

(Continued)

FOREIGN PATENT DOCUMENTS

WO WO 95/08416 A1 3/1995

*Primary Examiner*—Leo Picard
*Assistant Examiner*—Sunray Chang
(74) *Attorney, Agent, or Firm*—Reed Smith LLP

(57) ABSTRACT

A cutting apparatus includes a hi-accuracy three-dimensional cutting apparatus for topographic modeling that is electronically coupled with a computer. The computer has a central processor that executes instructions, a memory for storing instructions to be executed, and non-volatile storage for storing the messages. The executable computer instructions of the system include one or more algorithms for converting the complex and randomly-occurring contours found in natural terrain into an efficient series of modeling material removal swaths defined in simplified 2-axis cross-sections that are cut adjacent and parallel to one another. The swaths are defined in a simplified 2-axis surface contour-following rotation cutting device moved by the system's CPU, driver software, driver circuitry and/or logic circuitry. This multi-axis control of the system assures that each of the swaths are seamlessly rendered next to one another while also maintaining an optimal proximity between the upper surface of the 3D model and the rotation cutting device.

91 Claims, 9 Drawing Sheets

U.S. PATENT DOCUMENTS

| | | | | |
|---|---|---|---|---|
| 4,531,328 A | * | 7/1985 | Jewett | 451/409 |
| 5,000,628 A | * | 3/1991 | Sandoval | 408/25 |
| 5,003,484 A | * | 3/1991 | Vollmayr | 700/161 |
| 5,015,312 A | | 5/1991 | Kinzie | 156/63 |
| 5,137,398 A | * | 8/1992 | Omori et al. | 408/145 |
| 5,184,306 A | * | 2/1993 | Erdman et al. | 700/163 |
| 5,487,012 A | * | 1/1996 | Topholm et al. | 700/163 |
| 5,793,015 A | * | 8/1998 | Walczyk | 219/121.67 |
| 5,844,191 A | * | 12/1998 | Cox | 219/69.12 |
| 5,926,581 A | * | 7/1999 | Pritt | 382/294 |
| 5,945,996 A | * | 8/1999 | Migdal et al. | 345/420 |
| 6,149,561 A | * | 11/2000 | Beecherl et al. | 483/1 |
| 6,161,995 A | * | 12/2000 | Wakazono et al. | 409/191 |
| 6,229,546 B1 | * | 5/2001 | Lancaster et al. | 345/419 |
| 6,272,448 B1 | * | 8/2001 | Ishii | 703/2 |
| 6,869,259 B2 | * | 3/2005 | Lebkuechner | 409/132 |

\* cited by examiner

HI-ACCURACY THREE-DIMENSIONAL TOPOGRAPHIC MODELING APPARATUS

BACKGROUND OF THE INVENTION

This application claims the benefit of U.S. Provisional Patent Application Ser. No. 60/195,130 filed on Apr. 6, 2000, the entire disclosures of which are incorporated herein by reference.

FIELD OF THE INVENTION

The present invention generally relates to apparatus, methods and systems for creating in hi-accuracy three-dimensional geographically realistic topographic models, and more specifically, it pertains to apparatus for improving the accuracy of three dimensional (3D) terrain modeling generally, or for making such models quickly when needed in emergency situations, or for adding accurately and durably registered indicia to any in a variety of types of topographical models.

DESCRIPTION OF RELATED ARTS

Numerous attempts have been made to provide methods for modeling places or regions. However the techniques used to render the surface features of a place or region on a 3D terrain map, and indicating their relative positions and elevations, have remained either coarse in implementation (e.g., as in fashioning inclines or slopes), or have remained overly complicated whether being made by hand or attempted in arcane software routines that computers must interpret in order to direct motion-control apparatus in the creation of such models. For example, the difficulty of interpolating 3D map-contour data into efficient cutting paths is readily acknowledged by those familiar in the art. Most approaches to date however, comprise various methods of topographical model making that is done by hand or has indicia or "terrain accessories" that are placed by hand on 3D models—and therefore are subject to human error.

For example, in architectural models it is typical to represent elevational changes in the 3D models by painstakingly cutting out and layering contours which from a side view have a pronounced "stair-step" profile. Thus made, there is poor accuracy in slopes and inclines and the care needed to be assured of the exact placement of each of the contours is very time-consuming. Similarly, a hand-made approach is also used for adding indicia to 3D terrain models, including the methods of carefully applying narrow adhesive tape to the surface of the model, or interconnecting a series of pins with thread, to show outlines, boundaries, or define other surface features. Other methods include the optical projection of map details onto 3D terrain models so as to trace such details by hand. As mentioned above these methods are very time-consuming and subject to human error.

Three-dimensional topography, and the cartography related thereto, have been useful media in assisting in the visualization of features pertaining to specific geographical locations. It is quite typical for the human mind to assimilate the physical structure of things—and of the world around us, in a three-dimensional context. For example, when one sees an actual mountain peak that looms over a valley it is very easy to tell that the elevation of the peak is substantially higher than the floor of the valley below. Similarly, three-dimensional topography (and cartography applied to 3D surfaces) offers quick assimilation of elevational and scale features, such that the relative size, height and location of a mountain peak in relationship to a valley on a 3D physical model, or scaled terrain model, is also very easy to see. By contrast, two-dimensional map reading, or 2D topographical visualization, particularly by individuals who are not often exposed to such maps, can be much more challenging and is typically a skill that has to be learned and is developed over time. There are various fields where the perusal of 3D terrain models is very helpful, and can be instrumental in critical decision making particularly during emergency situations. For example, one such field is fire-fighting. Wildfires occur in numerous terrains under a variety of conditions that can influence their movement and shifting of movement. One of these conditions is wind, whose speed and direction can be affected by the terrain it moves over and by the movement of the wildfire in such terrains. Thus, the ability to understand topography easily and quickly, and to communicate to others the concerns and issues related to such terrain is very important. One of the applicants of the present invention has recently provided accurate 3D terrain models, on a quick turnaround basis to the U.S. Department of Forestry and to fire-fighters of Ventura County, Calif. During the handling of fires by these agencies, computer topographical data was quickly sent which was converted into a format suitable for accurately rendering the 3D models as needed for effectively managing these emergencies. The accuracy and 3D depiction of the terrains, and the speed in which the models were made, made it possible to easily oversee and update wildfire status and communicate terrain concerns to, and to supervise, the fire-fighting crews. Such topographical modeling advantages can also be applied in other emergency conditions, such as flooding, or avalanche management, or in military arenas including battlefield oversight and management.

While it is noted herein that an efficient modeling technique is highly desirable in providing quickly-created and accurate 3D terrain models for emergency situations, it is also noted that many non-emergency-related enterprises (including other types of 3-D modeling) can benefit from accurately made models as well. It is the purpose of the present invention to provide the means for creating such hi-accuracy 3-D models as needed.

It is apparent that both emergency and non-emergency sectors, and other modeling enterprises would greatly benefit from models which also incorporate hi-resolution printing, for example when any or all of the following detail or imagery is also rendered onto the surface of such models: topographic, cartographic, photographic, graphic, content, and accurately and durably registered indicia for defining important surface features and/or boundaries whether naturally-occurring or man-made. The printing aspect of the 3-D models of the present invention is described in of U.S. Provisional Patent Application Serial No. 60/195,129 filed on Apr. 6, 2000, and its corresponding regular U.S. Patent Application filed concurrently with the present application. The disclosure of both applications is hereby incorporated by reference.

Such accurately-made 3D models in conjunction with the hi-resolution printing rendered onto the surface of the models would be of great use to agencies, businesses, and professions concerned with: land development, architecture, land disputes (court cases), environmental studies, surveying, geological studies (e.g., oil exploration), surface mining, planning and remediation, resort and National Park modeling, waterway planning (e.g., for canals or shipping lanes), hydrography (e.g., underwater topography, dredging studies, port design), landfill planning and staging, extraterrestrial modeling (e.g., surface terrain of Mars or other planets, or asteroids), prototyping, and so forth. It is another purpose of the present invention to provide such hi-accuracy 3D models for imaging hi-resolution printing onto such models.

In U.S. Pat. No. 5,326,267, Brokaw employs "Model terrain accessories that are positioned for use on the surface of a miniature landscape are fabricated from a permanently flexible material, preferably polyvinyl chloride . . . " and states that "These flexible accessories are realistically contoured models representing roads, streams, stream banks, earthworks, and walls, or segments thereof." Brokaw's approach subject to human error, suggests a time-consuming process where numerous 'accessories' would need to be added to maps, each of which would be subject to movement in position, raising questions as to the durability of this approach particularly for in-the-field applications. U.S. Pat. No. 5,793,372 belonging to Binns, et. al. describes "Methods and apparatus for rapidly rendering photo-realistic surfaces on 3-dimensional wire frames automatically using user defined points . . . " However, that approach is for digital modeling, of the type used for viewing on a computer screen (i.e., for models inside a computer).

Thus, none of the above-referenced prior art incorporates the accurate topographic method and repeatability of a computer-imaging system comprising an apparatus for rendering hi-accuracy 3D terrain models, and for rendering accurately registered indicia onto the surfaces of such models.

SUMMARY OF THE INVENTION

It is the object of the present invention to provide such benefits and to overcome the time-consuming and less accurate disadvantages of both the prior art and the current status quo in terrain modeling, 3D-modeling and the making and imaging of 3-D objects.

In accordance with the present invention, methods are defined for an apparatus having computer and efficient algorithmic control of one or more rotation cutting means to: (1) cut a series of parallel paths and remove unwanted cross-sections of modeling material above the lowest perimeter edge of each of such cross-sections so as to render accurately scaled terrain models, and (2) cut durable and accurately registered and scaled indicia of a prescribed depth into the surface of any of a variety of types of topographical and other models.

Another aspect of the present invention is to provide an automated system for achieving the above-mentioned methods. The system includes a hi-accuracy three-dimensional cutting apparatus for topographic modeling that is electronically coupled with a computer. The computer has a central processor that executes instructions, a memory for storing instructions to be executed, and non-volatile storage for storing the messages. The executable computer instructions of the system include one or more algorithms for converting the complex and randomly-occurring contours found in natural terrains into an efficient series of modeling material removal swaths defined in simplified 2-axis cross-sections that are cut adjacent and parallel to one another. In a preferred embodiment of the invention, the swaths are defined in simplified 2-axis surface contour-following rotation cutting means moved by the system's CPU, driver software, driver circuitry and/or logic circuitry. This multi-axis control means of the system assures that each of the swaths are seamlessly rendered next to one another while also maintaining an optimal proximity between the upper surface of the 3D model and the rotation cutting means.

This system approach provides an economy of movement and commensurate increased speed in terrain model making and also provides for a more natural appearance to the flow of slopes, inclines, and ridges made by such systems. By contrast, a less efficient computer-controlled multi-axis system might otherwise execute a slower algorithmic interpolation which attempts to define cutting paths of the randomly shaped elevational contours such as the type found on topographical maps. However, such an approach would require substantial computer computation, and time-consuming cutting-path repetitions in order to eliminate, or significantly reduce, the pronounced "stair-step" appearance (or profile) that occurs in the elevational shifts from one elevational contour cut to the next.

Other executable computer instructions of the system include one or more algorithms for cutting durable and accurately registered indicia of a prescribed depth into the surface of topographical models. These indicia, when occurring on the terrain models, include, but are not limited to the formation of man-made boundaries such as property lines, easements, right-of-ways, land-development features (e.g., grading demarcations, grade breaks, cuts and fills); and of naturally occurring boundaries such as ridges and flow-lines, bodies of water, lakes, lake-beds, rivers, river-beds, forested areas including tree varieties, and so forth. The indicia can also include precisely registered: lettering including the accommodation of a variety of fonts; graphical embellishments (e.g., line art, filigree, vector outlines); and cartographic elements such as scale bars, compass roses, map legends, registration marks, latitude and longitude lines/markings, overlay of coordinate grid systems, and so on.

The system includes at least one rotation cutting means and a control interface having an electronic coupling to control bi-directional control of a plurality of stepper motors, and to control the starting, stopping, and amount of the at least one rotation cutting means, such that the motion-control and the cutting means driver instructions of the system are highly coordinated by the system's CPU, driver software, driver circuitry and/or logic circuitry. The system interface may include the driver circuitry and/or logic circuitry and may be housed external to the computer and separate from the stepper motors. Alternatively, one or more of the apparatus-controlling components housed therein can instead be located within the housing of the computer (e.g., on a circuit board interfaced with the CPU of the computer). Even more, one or more of such components could be located within, or mounted adjacent to, one or more stepper motor housing. The system also includes multi-axis actuation means, and a computer and interface control of same, including a plurality of stepper motor-driven lead-screws (at least one per axis) operative in one or more followers that are affixed to the carriages—each carriage being moveable in a single axis. The above-mentioned cutting means (e.g., a drill coupled drill bit) is affixed to one of the carriages.

Thus, when a stepper motor rotates as directed by the executable instructions of the system's computer, it causes a lead-screw coupled to the motor to displace its respective follower (and attached carriage) proportionate to a calibrated degree of rotation and pitch of the lead-screw thread. While it is describe in more detail in the section below pertaining to the drawings of the invention, it is noted in the invention summary that the stepper motors could alternatively drive other types of carriage actuating means such as systems that incorporate belts and pulleys, or rack and pinion types of actuation, (including armatures, or connecting rods). In any case, the system provides one or more surface contour-following, or 3D-following cutting means that are moveable in a multi-axis computer-controlled system. In one mode, the system actuates the movement of carriages to cause a model material to be cut via a series of parallel and adjacent paths, by varying the depth of a rotating bit coaxially coupled to the rotation cutting means such that the parallel and adjacent cross-sections from the modeling material will be sequentially removed to form naturally-appearing slopes, inclines, and the like. In a second mode, the system's carriages can be actuated to cause a finished terrain model to be cut by the variable depth of a rotation bit to cut durable and accurately registered indicia at a prescribed depth into the surface of such a model.

While it can be observed that numerous multi-axis cutting devices do exist, including ones that are interfaced with and controlled by computers, some undesirable conditions nonetheless persist in that such apparatuses have not been effectively adapted to the creation of accurately rendered terrain models, nor to the making of accurately registered and durable indicia therein. An unnecessarily complicated approach to cutting terrain models from topographical data prevails as defined by substantially randomly shaped and/or non-concentric topographical contours and that the interpolation of such data, and elevational cutting therefrom, that inevitably leads to the difficult challenge of eliminating a pronounced "stair-stepping" appearance. Thus, there is a need for apparatus of the present invention and for the improved methods of executing simplified and faster algorithms that can more quickly produce hi-accuracy terrain models (for example, during emergency conditions), and produce models that are more aesthetically appealing, (i.e., not having a stair-stepped appearance). It is the object of the present invention to provide such benefits and to overcome the complexities and disadvantages of both the prior art and the current status quo in terrain model making.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
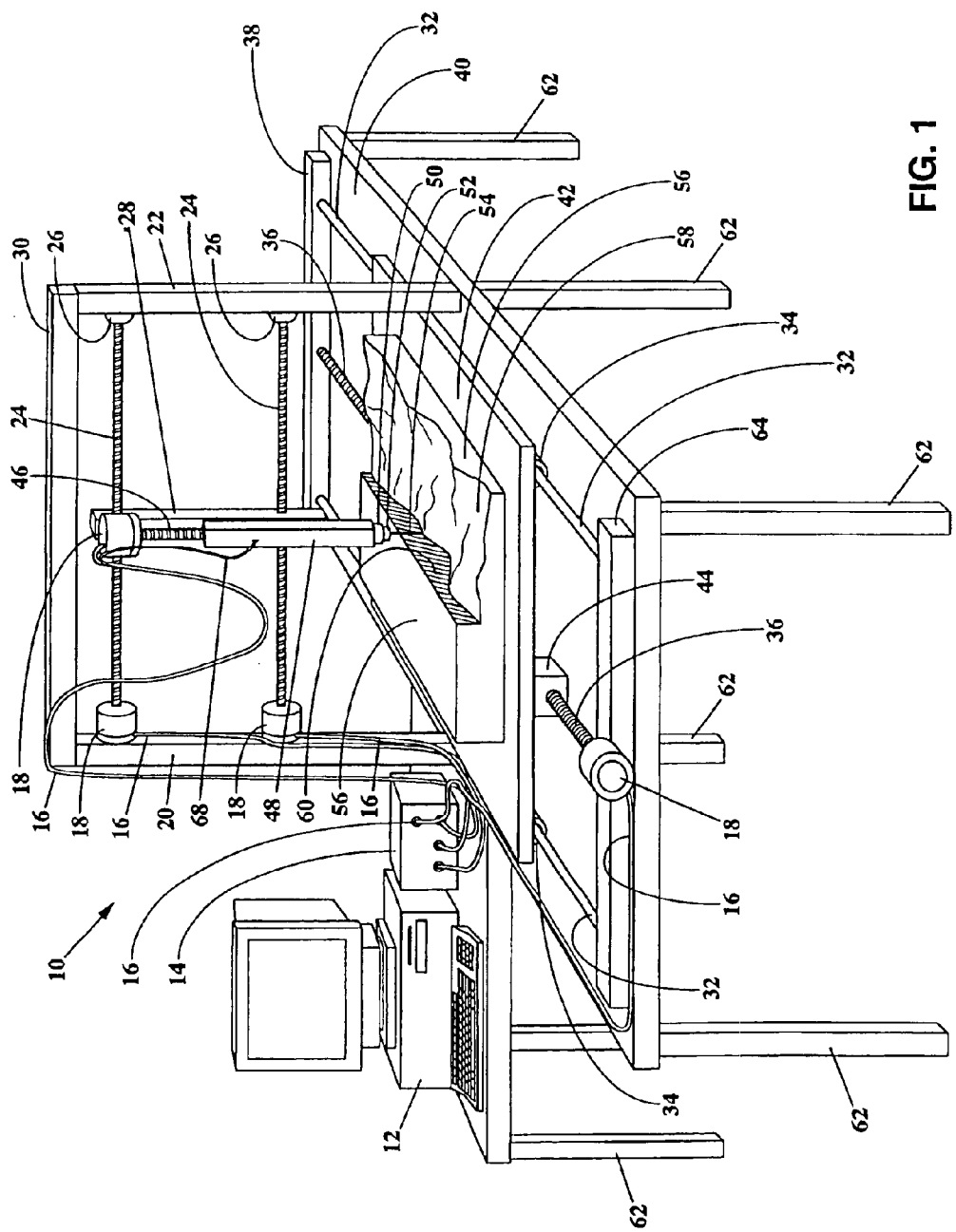
FIG. 1 is a three-dimensional view of a hi-accuracy 3D topographic modeling apparatus controlled by a computer system and a multi-axis control interface which collectively provide a method to direct a rotationally coupled cutting means through a series of parallel and adjacent paths and to remove unwanted cross-sections of material to thereby render a terrain model.

With reference to FIG. 1, a hi-accuracy 3D topographic modeling apparatus 10 is shown adjacent to and electronically coupled with a computer system 12. The computer has a central processor that executes instructions, a memory for storing instructions to be executed, and non-volatile storage for storing the messages. Also included is a control interface 14 having electronic coupling 16 to control a plurality of stepper motors 18. It is noted that, although interface 14 is shown in a housing which is external to the computer and separate from the stepper motors, one or more of the apparatus-controlling components housed therein could instead be located within the housing of the computer (e.g., on a circuit board interfaced with the CPU of the computer), and/or could be located within, or adjacent to, one or more stepper motor housing. Adjacent to computer 12 and interface 14 is a Y-axis support bed 40 that is supported by a legs 62. The upper surface of bed 40 supports rear end-block 38 and front end-block 64 which in turn support two of Y-axis guide rod 32 and an Y-axis lead-screw 36 the latter of which is rotatably coupled to a stepper motor 18 on one end (e.g., by a misalignment coupler, not shown) and is otherwise free-spinning at its opposite end within a portion of rear end-block 38 (e.g., within a bushing or bearing mounted therein). Lead-screw 36 extends through at least one lead-screw follower 44 which is attached adjacent to an underside surface of Y-axis carriage 42. Also attached to the underside of Y-axis carriage are a plurality of guide-rod friction-reducing means 34 (e.g., pillow blocks). While Y-axis carriage 42 is shown being guided in the Y-axis with the combination of rods and pillow blocks it is noted that any one or more of a variety of known guides and friction-reducing means can alternatively be employed (e.g., wheels on rails). The upper horizontal surface of Y-axis carriage 42 accommodates a topographical modeling material 56 such as low-porosity foam (higher porosity foam may also be used depending on the desired accuracy of the finished model). Experimentation has shown that polyethylene foam of 1.8 lbs/cu.ft. to 16 lbs/cu.ft. works well because it machines easily, holds its shape after cutting, is light to carry or move around and is relatively inexpensive. In a preferred implementation of the invention's final product, polyethylene foam of 8 lbs/cu.ft. has been found to satisfy most requirements. Wood or metal or practically any other machinable material could be used but the cost, weight and time it would take to machine those materials would be limiting factors in material selection and in some cases make some materials impractical for most applications.

Extending perpendicularly from bed 40 are X-axis motor-support member 20 and X-axis lead-screw support member 22, the upper ends of which are connected to lower opposite ends of upper cross-member 30—the three members forming an inverted U-shape. The inverted-U is shown supporting two of stepper motor 18 each having one end of an X-axis lead-screw 24 rotatably coupled thereto (coupling not shown) such that the parallel lead-screws traverse from motors 18 through X-axis carriage 28 and followers resident therein to lead-screw friction reducing means 26 mounted on an inward-facing surface of member 22. A plurality of stepper motor 18 is mounted to an upper forward-facing end of X-axis carriage 28 each having a Z-axis lead-screw 46 rotatably coupled thereto that extends into an upper end of a respective Z-axis carriage 48 and at least one follower resident therein (follower not shown). Z-axis carriages 48 are slideably mounted to X-axis carriage 28 and may include one or more Z-axis guide means 66 and/or friction-reducing means such as any one or more of a variety of known means to facilitate free movement in a single axis (e.g., tongue-in-groove guides, guide bearings or guide rollers, and the like—not shown). Rotational cutting means 50 such as a hi-speed drill with a rotatably mountable drill bit is mounted within axis carriage(s) 48. The preferred embodiment of the invention shows a single axis carriage 48 slidably mounted to X-axis carriage 28. However, it is noted that X-axis carriage 28 can alternatively be scaled larger in size to accommodate a plurality of axis carriages 48 each having a rotational cutting means 50 mounted therein to facilitate faster modeling times (proportionate to the multiple of drills). While the axis carriage 48 in FIG. 1 is shown having cutting means 50 mounted therein, it is noted that a cutting means 50 could alternatively be achieved by one or more overhanging external hi-speed drills (such as a Foredom® drill) having a cable-drive that is insertable into an opening in the axis carriage 48 such that the cable end nearest the chuck of the drill can be secured near the lower end of carriage (not shown). Beside the drill as described above, other cutting or chemical-depositing techniques may be applied in other specific forms without departing the spirit or essential characteristics thereof.

Although the inverted U-shape in FIG. 1 comprised of members 20, 22 and 30 is shown having a fixed position, it is noted that the combination of these members could alternatively form an inverted U-shaped gantry which could be moved and actuated fore and aft in the Y-axis. For example, modeling material 56 could rest on the uppermost surface of bed 40 and the gantry could be actuated fore and aft over the modeling material. In which case, two of stepper motors 18 each mounted at opposite upper ends of front end-block 64 can have a Y-axis lead-screw 36 rotatably coupled thereto such that one lead-screw extends through a lower portion of member 20 and the other lead-screw extends through a lower portion of member 22 (each member having at least one follower within the lower portion traversed by the respective lead-screws) and be rotatably mounted at an opposite ends within rear end-block 38. Thus, a simultaneous spinning of both motors and the respectively coupled lead-screws would cause a corresponding Y-axis movement of the inverted U-shaped gantry.

While each of X-axis carriage 28, Y-axis carriage 42, and Z-axis carriages 48 is shown being actuated with the combination of one or more stepper motors, lead-screws and followers, it is noted that any one or more of a variety of known carriage actuation means can alternatively be employed, such as a stepper motor-driven belt and pulley means, a stepper motor-driven rack and pinion means, stepper motor-driven armatures, linear actuators, or the like. Similarly, one or more of the stepper motors can alternatively be replaced with servos or other actuation means. It is also noted that, although X-axis carriage 28 is shown being actuated by two lead-screws 24, it is apparent that the X-axis carriage can alternatively be actuated by a single X-axis lead-screw 24. Furthermore, it is noted that although the methods described thus far in the cutting of hi-accuracy models have illustrated an apparatus having three axes of controlled movement, it is apparent that control of more axes can readily be achieved. For example, a drill can be pivotally mounted to the Z-axis carriage and controlled within a pivotable range by executable instructions from the systems computer and interface. Alternatively, the addition of rotational computer motion-control is readily incorporated by the apparatus of the present invention by the addition of a stepper motor-driven turntable having a base mounted adjacent to an upper surface of Y-axis carriage such that the surface of the turntable is parallel to the surface of the carriage. Orbital cutting paths are readily achieved by a stepper motor-driven spindle positioned in a manner to align the rotational axis of a rotatably mounted modeling material such that it is perpendicular to the Z-axis. Thus, systems having more than three axes of control and systems providing rotational and orbital cutting paths are also readily achieved by the systems, methods, and apparatus of the present invention.

In operation, a suitable modeling material 60—preferably comprised of one or more elements that is easily cut or shaped by at least one rotating drill bit such as hi-density foam or soft wood—is secured to a fixed position on the upper surface of Y-axis carriage 42. The apparatus can incorporate any of a variety of known computer-automated drill bit, mill bit, or router bit selection means (not shown). However, in reference to FIG. 1, a desired drill bit 54 is manually selected for optimum diameter and cutting profile for a given terrain model and the bit is secured within collet 52. Alternatively, the system can incorporate a mountable thermal cutting element that can be secured to a lower end of an axis carriage such that the lower end of the element is heatable (e.g., electrically heated tip) in a range sufficient to remove heat-cut paths of modeling material at a desired width and depth from the upper surface of finished terrain models (not shown). In either case, the system, including the computer 12, control interface 14, stepper motors 18 with coupled lead-screws and associated followers and carriages, are all responsive to limit switches and/or other sensors (not shown) to facilitate the positioning of the drill bit (or thermal element described above) in a beginning 'home' position. The computer system is equipped with executable instructions to achieve home positioning. Thereafter, stepper motor rotation of X-axis lead-screws 24 cause X-axis carriage 28 to move the tip of bit 54 to a beginning cutting position of the modeling material 56, for example to the upper corner of the material nearest the support member 22 and rear end-block 38. Once positioned for cutting, rotational drive means 50 is started and a single two-dimensional path defining a Y cross-section of material to be removed (by rotating bit 54) from the model is executed such that the slopes or inclines defined by the lowermost edge of the newly cut cross-section are smoothly formed (without 'stair-stepping'—due to linear axis motion control). At the completion of the first Y path, stepper motion rotation of X-axis lead-screws 24 causes X-axis carriage 28 to move the tip of spinning bit 54 in the X-axis no greater than the width of the bit itself such that the next path is aligned with an uncut region of modeling material 56. A second two-dimensional path in the opposite Y-axis direction from the first path is then executed. Thus in a series of parallel cutting paths implemented in a −X, +Y and variable alternating with a −X, −Y and variable repetitive pattern, material can quickly and accurately be removed from the modeling material 56 (such as Y cross-section 60) to create a smooth and aesthetic surface on each terrain model.

Figure 2:
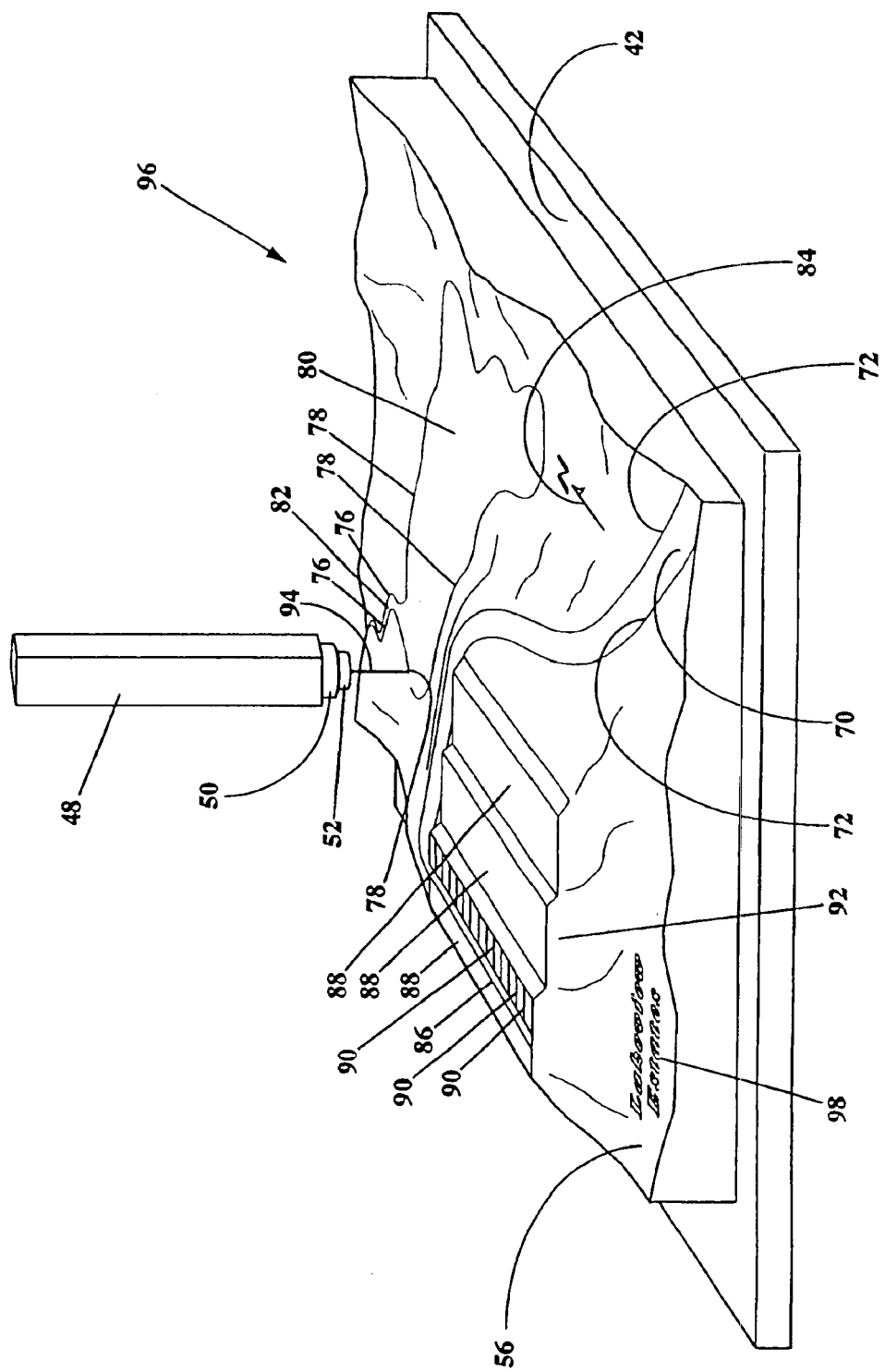
FIG. 2 is a close-up three-dimensional view of a rotational cutting means following a computer-defined boundary, which illustrates the method of rendering durable and precisely registered indicia on the surface of a terrain model.

In reference to FIG. 2, a terrain model indicated generally below the end of lead-line arrow 96 is located adjacent to the upper surface of Y-axis carriage 42 and is shaped out of modeling material 56 (such as high-density foam, or a soft wood) according to the structural and operational descriptions relating to FIG. 1. FIG. 2 is an enlarged view of the Y-axis and X-axis carriages seen in FIG. 1 with X-axis carriage 28 having a rotational drive means 50 (e.g., a drill)

extending out of a lower end thereof such that a small diameter bit 94 held within collet 52 is controllable to cut accurately registered indicia of a prescribed depth into the surface of any in a variety of types of topographical models, such as terrain model 96. For the sake of simplifying the drawing, FIG. 2 does not show the carriage actuation means described above in reference to FIG. 1 but is noted that the Y-axis and X-axis carriages of FIG. 2 are controllable in an identical manner. In the lowest elevations of the terrain model 96, a body of water demarcation 78 and river boundary 76 are being formed by a relative 3-axis movement of the rotating small diameter bit 94 through an upper surface of the model at a prescribed depth. The bit is shown completing include but are not limited to the formation of man-made boundaries such as property lines, easements, rights-of-way, land-development features (e.g., grading demarcations, grade breaks, cuts and fills); of naturally-occurring boundaries such as ridges and flow-lines, bodies of water, lakes, lake-beds, rivers, river-beds, and the like. The indicia can also include precisely registered: lettering including the accommodation of a variety of fonts; graphical embellishments (e.g., line art, filigree, vector outlines, etc.); and, cartographic elements such as scale bars, compass roses, map legends, registration marks, latitude marks, latitude and longitude lines/markings, overly of coordinate grid systems, and so on. For example, at the highest elevation of the model site development area 92 is seen having three tiers of superpads 88, the highest of which street demarcation 86 and a plurality of lot lines 90 are cut therein. Outlining a smooth compound slope in the form of right-of-way 70 are right-of-way boundaries 72 which have also been cut at a prescribed and controllable depth in response to executable instructions which were read by the system of the present invention such that the cut depth (e.g., 0.50") is maintained along the length of any given boundary, or other indicia, graphic element, or demarcation. For example, cartographic element 84 (e.g., a compass indicator) and typographical element 98 (e.g., spelling "Lakeview Estates") comprising one or more font designs are cut into the upper surface of model 96 at a consistent desired depth regardless of the elevational topography of the model.

Executable indicia-data instructions of the computer of the present invention, in combination with the components comprising the system's control interface and coupled multi-axis actuation means (stepper motors and their respective lead-screws, followers and carriages) collectively cause the relative movement of the tip of small diameter bit 94 to accurately and durably cut indicia—of the types described above—in finished topography of terrain models. These executable instructions include algorithms, or software routines, for interpreting any one or more of the following into the typographical surface cut indicia: graphic art, vector lines, cartographic symbols and embellishments, typographical elements including fonts and font styles, as well as the natural and man-made geographical demarcations discussed above.

Figure 3:
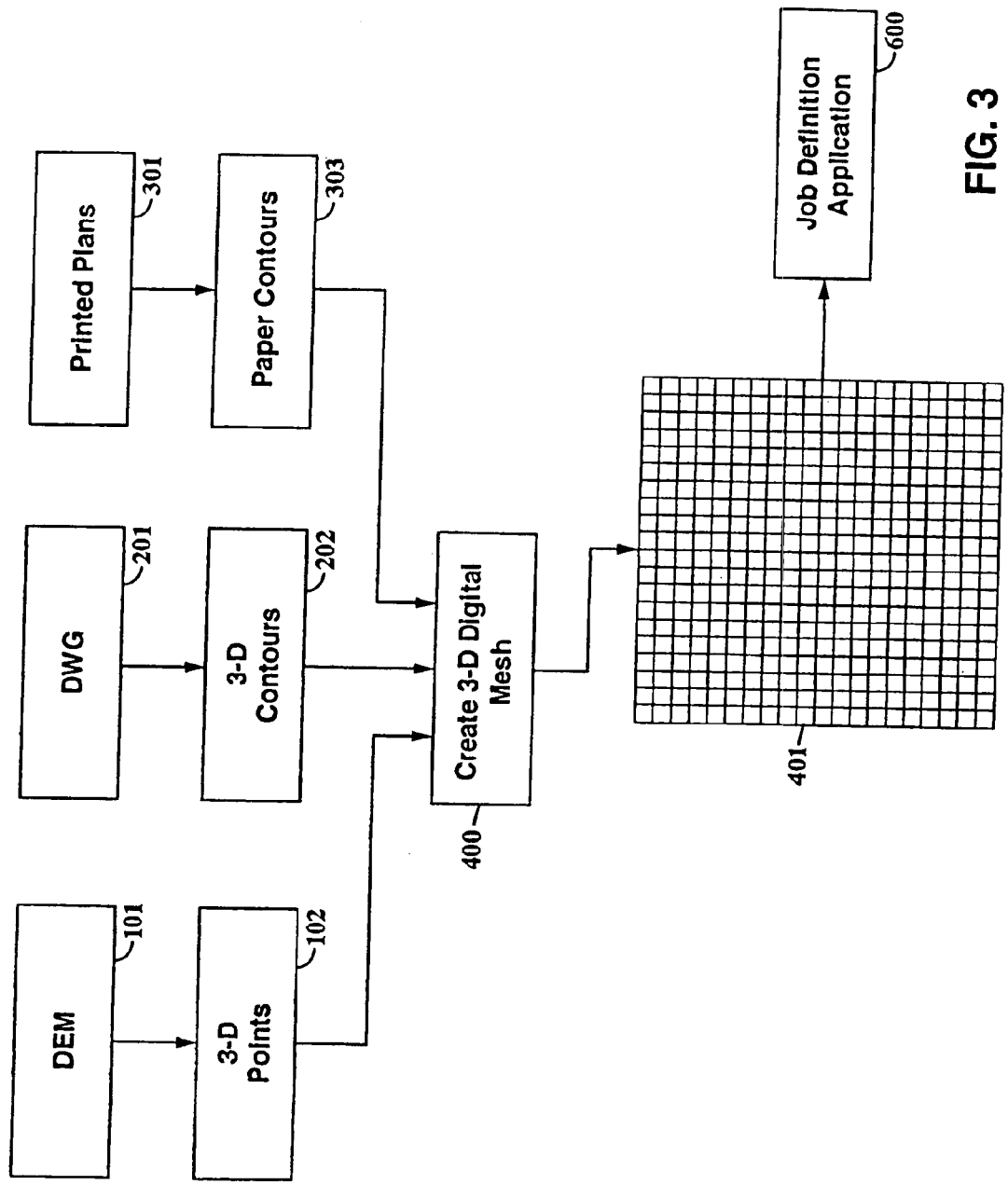
FIG. 3 is a block diagram of three data processes for creating a 3D digital mesh or grid of the present invention.

For example, in reference to FIG. 3, existing terrain data or elevation data is usually in one of three forms, 3D digital points 102, 3D digital contours 202 or paper contours 303. The USGS website at http://edcwww.cr.usgs.gov/doc/edchome/ndcdb/7_min_dem/states.html provides Digital Elevation Models (DEMs 101) in 3D digital points 102. DEM 101 is a file type created by the US Geological Survey (USGS). Contour data, 3D or 2D, are usually prepared by civil engineers with Computer Aided Design (CAD) programs such as AutoCAD® from AutoDesk® (.dwg files 210), Microstation® (.dgn files), TerraModel® from Spec- traPrecision® (.pro files), Surfer® from Golden Software® (.grd files 501). DWG 201 is the native file extension of AutoCAD® files. In addition to the above-mentioned CAD programs, geographical information (GIS) software, such as ArcInfo® from ESRI®, also import and export data in several different formats. The lowest common denominator in file exchange formats is an ASCII point list. This is a "plain text" (.txt 502) file that usually consists of three coordinates for each point separated by spaces or commas. This format is easily written by practically any program that is designed to work with 3D data.

As shown in FIGS. 3 and 4A–4D, that data is converted or translated by software stored in the computer system 12 so as to create a seamless 3D digital mesh or grid 401 via a step 400. Specifically, the 3D coordinates for the actual data points (See FIG. 4A) are translated into a 3D mesh or grid of equivalent 3D coordinates for grid data points derived by interpolation from the original 3D coordinates. The equivalent grid data points correspond to the grid nodes of a predetermined matrix of A×A points (See FIG. 4B). Initially, the A×A points are defined on a 2D horizontal plane with only xy-coordinates. The value of A is based on the desired resolution for the intended final product, namely the 3D terrain model. As the actual data points are translated into grid data points, the grid data points are converted to include xyz-coordinates so as to correspond three-dimensionally with the original actual data points (See FIG. 4C). The grid data points are stored in a data file known as a .grd file, as will be further discussed hereinbelow. Experimentation and actual use has found that a 2D matrix of 20×20 points per inch is optimal, though matrices as low as 10×10 points per inch have been used, while much higher densities of points per inch may also be used to obtain higher resolutions. As one of skill in the art would understand, the only limitation to using or obtaining a desired resolution is the type, size, material and quality of the tooling available at the time. For example, using more than 20×20 will improve the smoothness of the resulting surface but increase cutting time significantly. Using fewer than twenty will decrease the smoothness but decrease cutting time. Twenty rows and columns lines per inch is a preferred compromise between speed and quality. Cutter sizes are chosen to fit the distance between data points. For example, in a preferred implementation, a $\frac{1}{16}$th inch milling bit is used to cut twenty lines per inch.

With respect to the 3D digital points 102, one preferred method for translating the actual data points into grid data points of the 3D mesh or grid 401 is the triangulation with linear interpolation method. The Triangulation with Linear Interpolation method uses the optimal Delaunay triangulation. The algorithm creates triangles by drawing lines between at least three actual data points (See FIG. 4D) that surround a given grid node; actual data points are considered to surround a grid node when viewed when the xy-coordinates of the actual data points are projected onto the 2D matrix of grid nodes.

Figure 4:
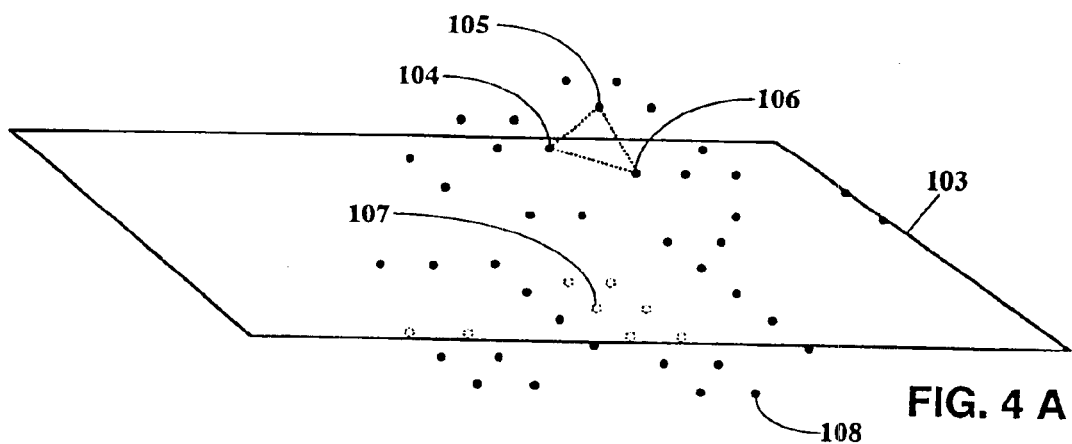
FIGS. 4A–4D visualize the triangulation with linear interpolation method applied in the present invention.
Figure 4:
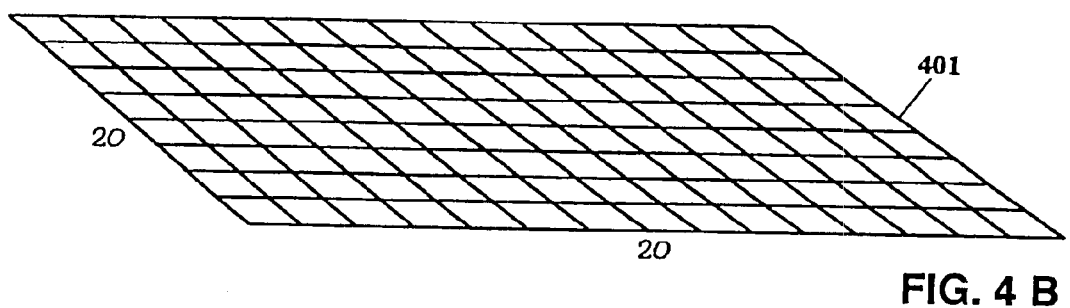
Figure 4:
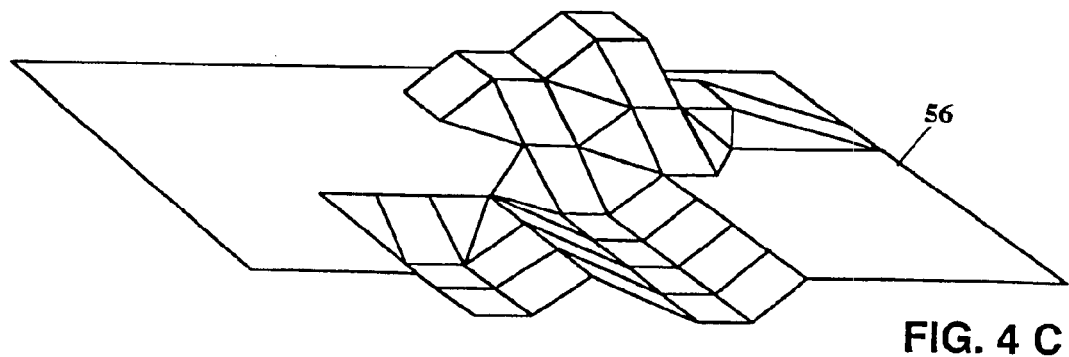
Figure 4:
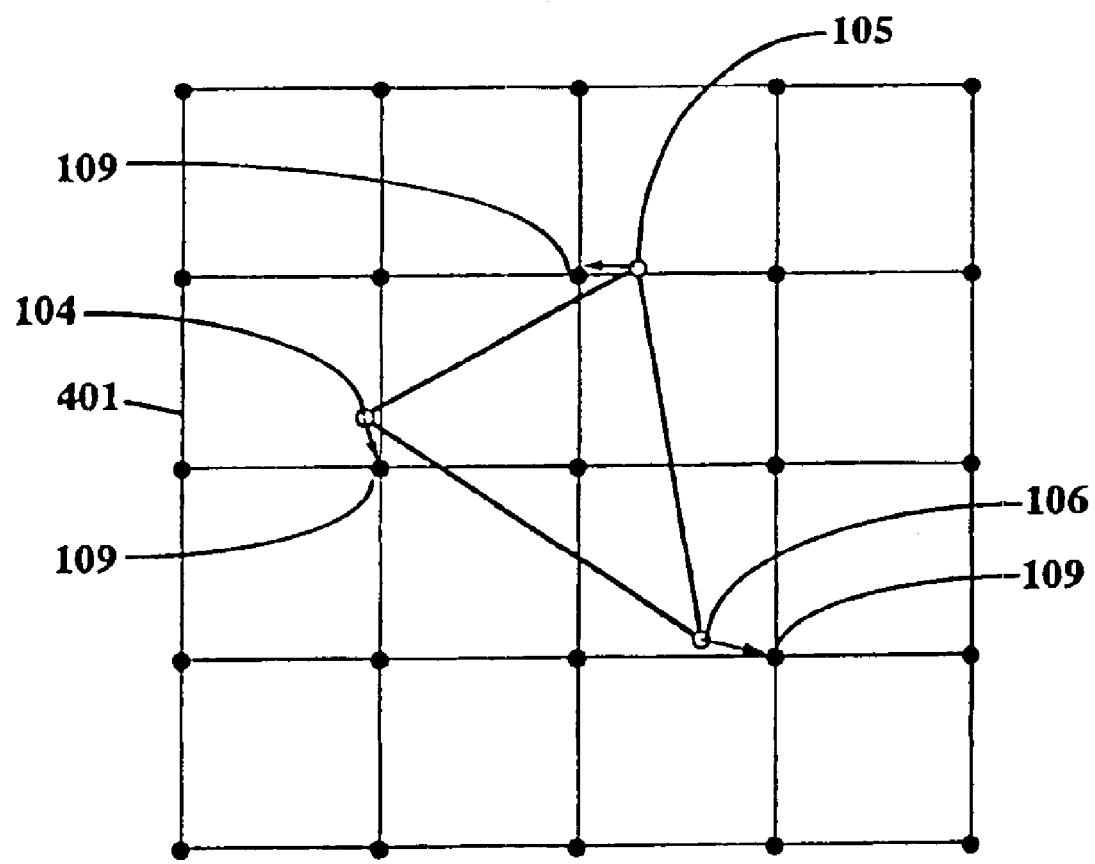

As shown in FIG. 4D, the actual data points are connected in such a way that no triangle edges are intersected by other triangles. Each triangle defines a 3D plane over the grid node(s) lying within the triangle, with the tilt and elevation of the triangle determined by the three original data points defining the triangle. All grid nodes within a given triangle are defined by the triangular surface, wherein the xyz-coordinates of the grid data points for the grid notes correspond to points that lie on the planes of the triangles. Because the original data points are used to define the triangles, the grid data points follow the original contours of the terrain to be modeled very closely. However, unlike the actual data points, as shown in FIG. 4C, the 3D mesh or grid 401 is an array of 3D grid data points that have consistent spacing and no unknown elevations (holes).

With respect to the 3D digital contours 202, the points from the contours are extracted and then interpolated to a mesh or grid 401 with any off-the-shelf CAD software, such as AutoCAD® and TerraModel® that have such a function built in. The contour lines 202 are not actually curves but a series of short line segments. The extraction process creates a point at the end of each of these line segments. The number of the extracted points depends on the numbers of line segments per each contour line. The shorter the line segment of the original contour is, the more points are extracted. These points are randomly spaced and are used as the actual data points to be translated into the grid data points.

With respect to the paper contour data 302, the terrain data is initially composed of printed maps illustrating, among other features, surface contours and elevations. That contour and elevation data is digitized into xyz-coordinate data using known digitizing techniques, and then interpolated into the 3D mesh or grid 401. One way of digitizing the terrain data is by using a mechanical arm to trace each contour and record points that fall on that contour and that correspond to the selected A×A grid. Each point is assigned an elevation as it is being recorded.

In addition to the Triangulation with Linear Interpolation method, other interpolation methods are also applicable for interposing the 3D actual data points into the 3D mesh or grid; such methods include the Minimum Curvature method, Shepard's method, the Kriging method, Polynomial Regression method, the Inverse Distance to a Power method, the Nearest Neighbor method, and the Radial Basis Functions method.

In the prior art, plates of material were cut corresponding to the contour lines of a surface to be modeled, and then stacked on top of each other to create a 3D surface. The thickness of each contour would determine how fine or coarse the resulting surface would appear, wherein more layers and/or thinner plates of material provide a finer, smoother surface appearance. The problem is in having to choose a vertical contour interval that will accurately represent the surface, especially when the surface contains level areas, such as building pads or other significant features, that fall in-between the contour interval. For example if the contour interval is 10 feet and there are five more building pads that differ from each by 2 feet each, by adhering to the 10 ft. contour interval, one would produce five building pads that appear to be the same elevation with a sixth pad 10 feet higher than the first five pads. In contrast, using the method of cutting cross-sections of the present invention, there in no need to choose a vertical interval and each pad will be exactly the right height.

In addition to xyz-coordinates in the actual data from the three existing terrain or elevation data (i.e., 3D digital points 102, 3D digital contours 202 or paper contours 303), such initial data may include information relating to other features represented on the desired terrain model. Such features include urban/city layouts, roads (improved and unimproved), rivers, airports, and other natural or man-made features to the landscape. Such features may also include topographical data or other informational representations such as boundary lines, compass directions, country/state/city/county names and reference point names/coordinates. Such information may be formatted separately from the xyz-coordinate data so as to overlaid with the xyz-coordinates at a later point in time. Alternatively, such information may be incorporated into the whole of the data of the terrain to be modeled; one example of this situation is with paper contour data 303. In either situation, such additional information may be separated and thereby extracted from xyz-coordinate data using techniques known in the art (i.e., digitizing the data separately from the xyz-coordinate data). Also using known software techniques, the additional information may be converted into vector data and saved in a .txt file, so as to be usable by the apparatus of the present invention. As will be explained further hereinbelow, the vector data is used to operate the system so as to cut and represent the additional information into the terrain model.

Further, the initial data may include information relating to the color and gray scale of each xyz-coordinate whereby a desired terrain may be represented in full-color. Using known software techniques such as those available in commercially available graphics software packages (e.g., AutoCAD®, PhotoShop®), the color/gray scale data may be converted into, for example, bitmap data stored in .bmp files for use in printing full-color features onto the desired terrain model.

Figure 5:
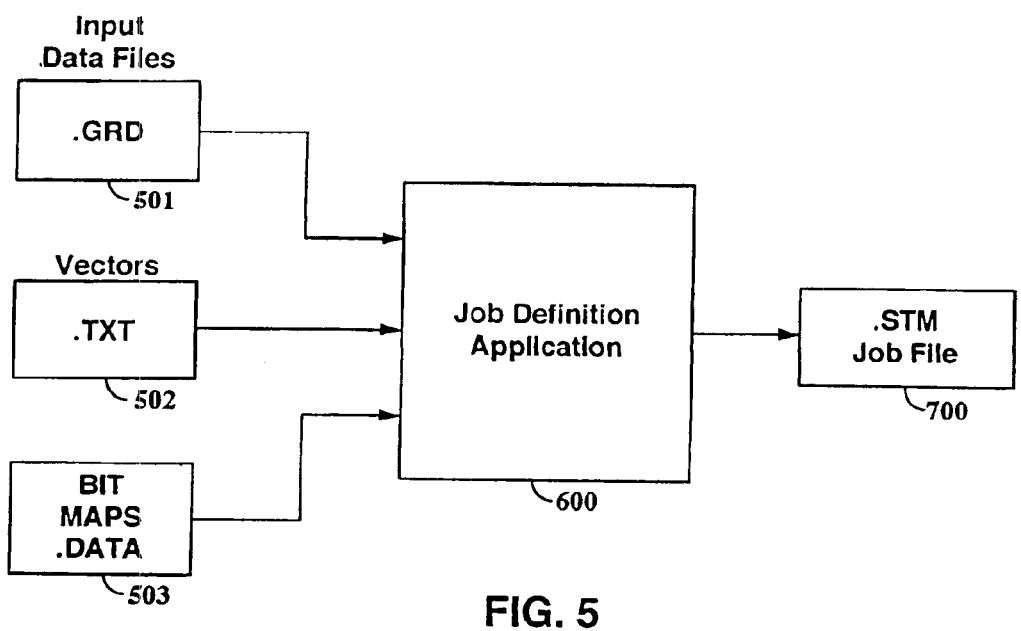
FIG. 5 is a block diagram illustrating the operation of the Job definition application of the present invention.
Figure 6:
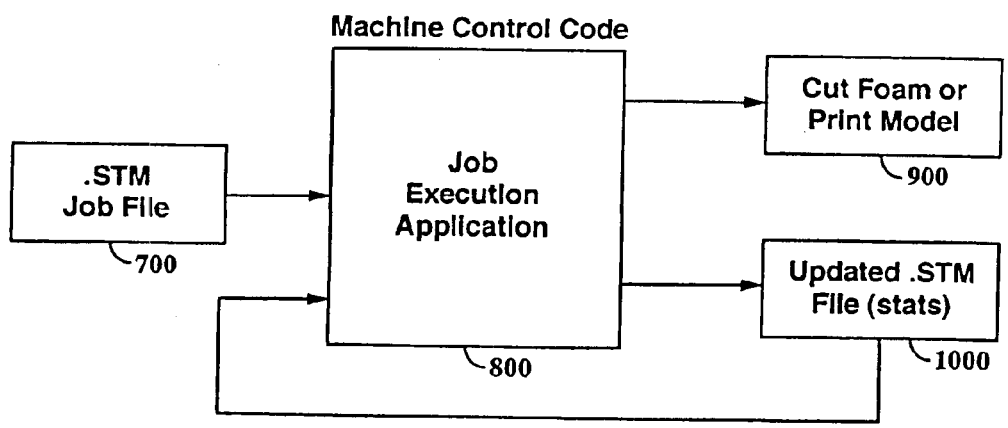
FIG. 6 is a block diagram illustrating the operation of the Job Execution application of the present invention.

As shown in FIGS. 5 and 6, the software that controls the apparatus of the present invention incorporates two main components: (1) the Job Definition Application; and (2) the Job Execution Application. For each desired terrain model, the Job Definition application 600 receives the data files for the grid data points (.grd data 501), vector data (.txt 502), and color/gray scale data (bit map data 503). The Job Definition application then interposes the three received data into a single .stm job file 700 that is then used by the Job Execution application 800 (See FIG. 6). In at least one implementation of the Job Definition application 600, the processes for (1) interpolating the actual data points into grid data points, (2) generating vector data for the .txt vector files, and (3) generating the bitmap data are incorporated into this applications functions. In other implementations, the above functions may be formed in separate applications that inter-operate with the Job Definition application or as applets, subroutines or their equivalents that are accessed by the Job Definition application, all of which one of ordinary skill in the art would understand given this disclosure of the present invention.

In reference to FIG. 6, the .stm job file 700 is forwarded to the Job Execution application 800 to be translated into motion files (machine control codes) for controlling the hi-accuracy 3D topographic modeling apparatus 10 to cut the modeling material 60 accordingly in block 900. The Job Execution application 800 also receives user input data such as tool type, tool size, material type, desired scale, etc. The Job Execution application then generates the tool path data or motion files based on the .stm job file 700 and user inputted data, such as that described hereinbelow in the operation of the system. The motion files include data on the x-z movement of the system for each cross-section on a single path, as will be explained hereinbelow, as well as velocity data for at least the single axis carriage 48 moving along each path. The velocity data is necessary, for among other reasons, so that cutting of vertical or near-vertical surfaces can be achieved.

In one implementation of the Job Execution application 800, a user may input modifications to the machine control codes during operation such that a user can interrupt the cutting anytime to make changes to the operation such as re-aligning the cutter, jogging the cutter to perform a modified cut, calibration, maintenance or even tool changing.

In another embodiment, the Job Execution application 800 is further equipped with artificial intelligence or other equivalent analytical applications which can reconcile inconsistent parameters, identify and correct radical changes in data, identify errors ("abnormalities") in the system, generate warnings, and incorporate safety protocols automatically. Alternatively, a user may simply take over control of the system.

Figure 7:
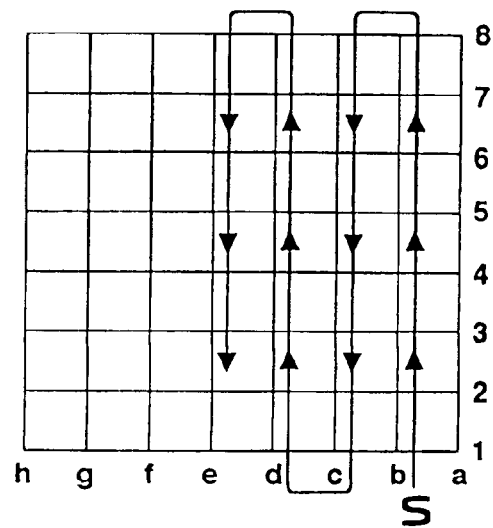
FIG. 7 shows the a travelling paths of the cutter of the present invention between grid points.
Figure 8:
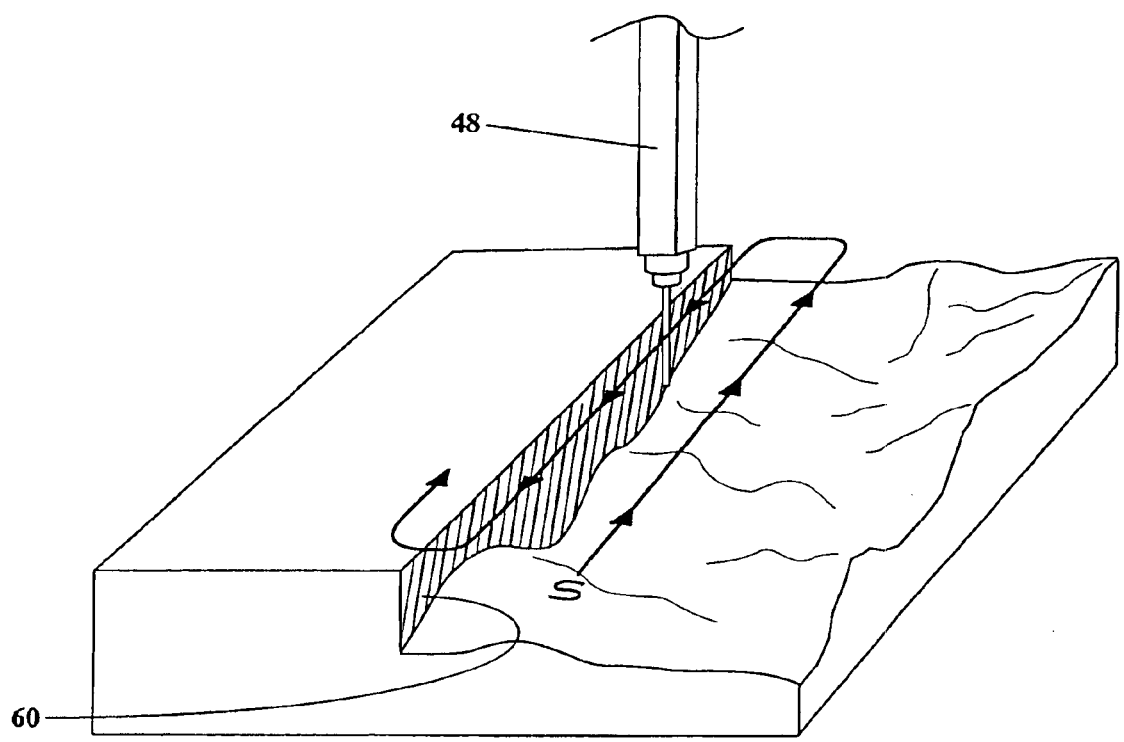
FIG. 8 is a perspective view of a cutter of the preset invention removing material in successive cross-sections.

In the operation of the system, as shown in FIG. 1, the modeling material 60 is loaded on the apparatus 10. The motion files are used to control the cutters such that they remove material in successive cross-sections. With reference to FIGS. 7 and 8, the cutter 48 travels along the 3D mesh or grid, in a serpentine pattern, from one end of the material 60 to the other along a single path b, and then in the opposite direction from one end to other along the next path c. As the cutter completes one path, it moves or jogs to the next successive path (i.e., d–h and cuts the next path in the opposite direction. Each of the paths represents a single cross-section of the terrain to be modeled along the x-z plane, such as that shown in FIG. 10.

Figure 9:
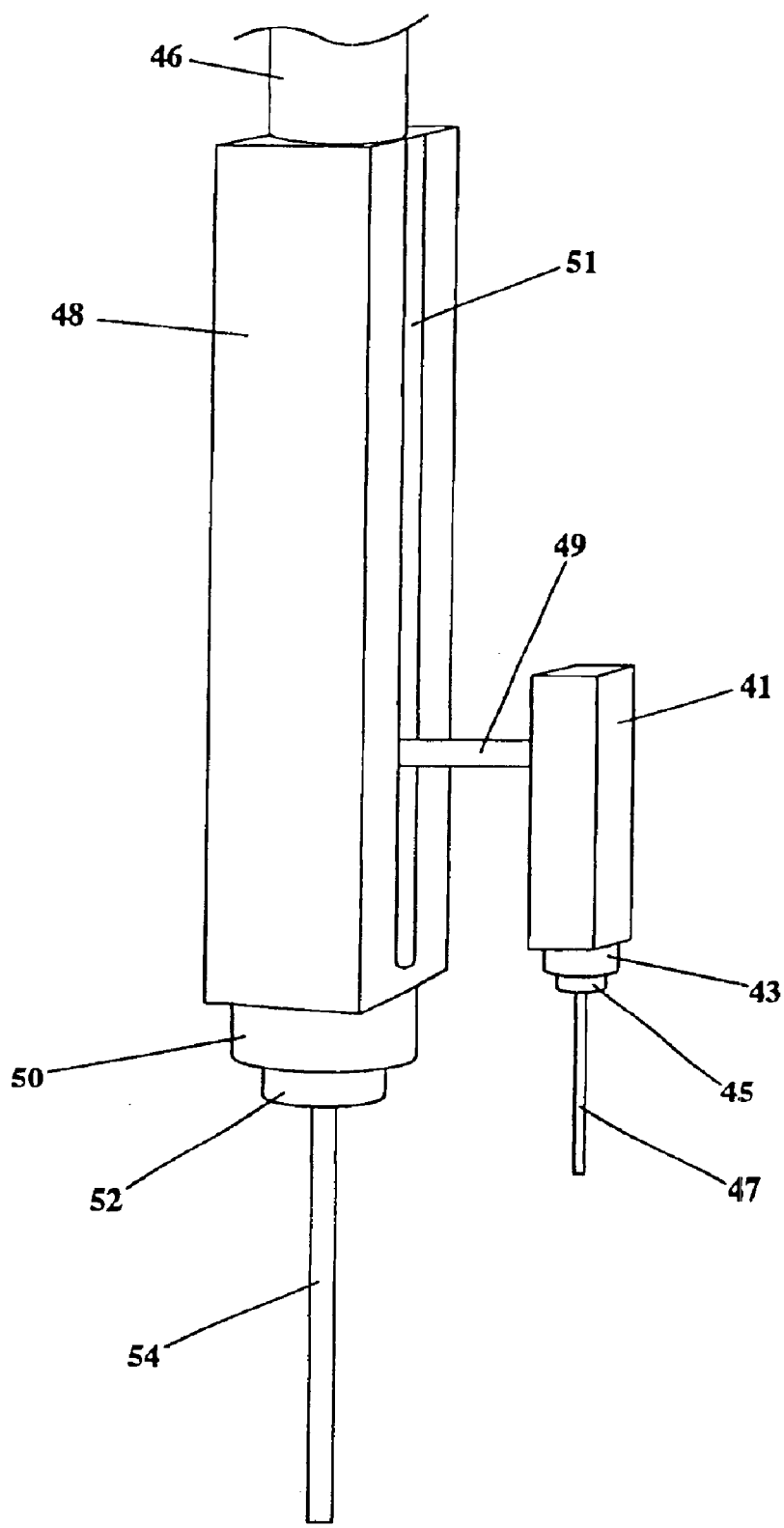
FIG. 9 is a perspective view of one embodiment of the cutters of the preset invention.
Figure 10:
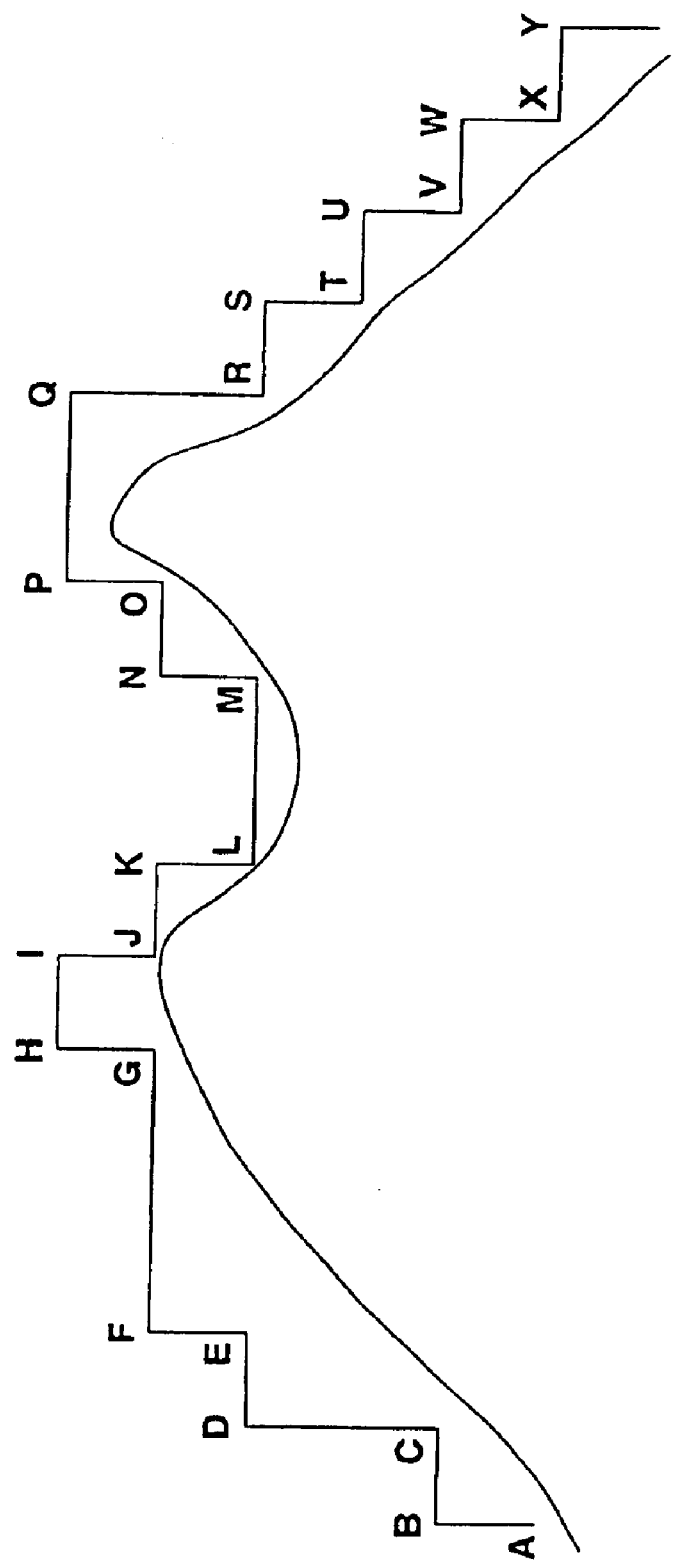
FIG. 10 shows the rough pass on which the larger cutter of the present invention travels.

In order to optimize the cutting of the material 60, as illustrated in FIG. 9, the operation of the system is done in two phases: (a) the process begins with a rough cutting phase using the single axis carriage 48 equipped with a larger milling tool in order to remove the bulk of the unwanted material; and (b) a fine cutting phase using either single axis carriage 48 equipped with a fine milling tool or an auxiliary carriage or cutter 41 to do the final shaping. The auxiliary cutter 41 may be implemented using an air spindle cutting device or other equivalently smaller milling device. As shown in FIG. 10, the single axis carriage 48 quickly makes a rough pass at a coarser resolution to eliminate excess materials. As noted above, the Job Execution application 800 functions to operate the system based on the inputted terrain data and user input data, such as tool type, size, desired resolution, etc. In the case of performing the initial rough cutting, the Job Execution application 800 generates a motion file wherein the single axis carriage 48 moves from point A, to B, . . . to Y in sequence. For performing the fine cutting, the single axis carriage 48 may follow the more contoured path at a lower speed to place fine details with higher resolution. Alternatively, using the auxiliary cutter 41, the single axis carriage 48 may follow the rough cutting tool path A to Y while only the auxiliary cutter 41 cuts following the contoured path. Though both implementations are capable of generating the desired terrain model, use of the auxiliary cutter 41 limits the wear and tear on the single axis carriage 48 as the use of the carriage 48 for fine cutting can exert considerable jerky movements in all directions on the entire system. The use of the auxiliary cutter 41 limits the jerky movements primarily to her auxiliary cutter itself. In addition, the use of the auxiliary cutter 41 carried by the larger single axis carriage 48 is preferred since the finer cutter can move faster and within a shorter range than a larger cutter on the single axis carriage.

In addition, as noted above, the Job Execution application 800 adjusts the moving speed (at both axes of the cross section 60) of the single axis carriage 48 to almost zero at point A to ensure a steep cut is made to point B. Otherwise, a slope rather than a vertical step would be made between point A and point B.

The movement of the auxiliary cutter 41 is also controlled by the Job Execution application 800 to move along the contoured path at different speeds in order to cut out slopes of different degrees. For example, the auxiliary cutter 41 moves faster between point L to point M than from point M to point O because there is less material to be cut off into a smoother slope from L to M than from M to O.

The type of tools used in performing the above-described cutting includes standard fluted end milling tools. The rough cutting may be done using a larger diameter end mill 54 with a flat bottom and straight sides (0.500" typ.). The fine cutting may be done using a 0.0825" end mill 47 with tapered sides (10° typ.). The tapered bit ensures that there are no truly vertical surfaces in the model, giving a more realistic appearance and has the added benefit of allowing printing onto the angled surface from above as compared to a vertical surface which cannot be printed upon at all.

In another embodiment, a multiple cutting head is used in either the single axis carriage 48 or in the auxiliary cutter 41 to enable multiple cutting. This allows either cutting by each cutting element at different speeds from one another, or higher resolution in cutting details on the material surface.

In addition to the mechanical cutters, other types of cutting techniques can be applied, such as laser cutting, plasma cutting, and abrasive cutting, Electric Discharge Machining (EDM), chemical-deposition cutting (by etching the surface with some resistant for protecting some portions of the surface, or by masking in connection with ion deposition processes).

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. An antomated system for producing a hi-accuracy three-dimensional topographic map based on interpolated three-dimensional topographical data pertaining to an actual geographical area, comprising:

topographic-data interpolation means for translating topographic data pertaining to the three-dimensional topography of an actual geographical area into a series of adjacent and parallel vertical cross- section planes and a series of adjacent two-dimensional contours wherein each plane of said series of cross-section planes incorporates one contour of said series of adjacent two-dimensional contours; wherein said topographic-data interpolation means is capable of forming said contours based on cartographic information related to said topographic map in addition to said topographic data;

cutting means for cutting said hi-accuracy 3D topographical map based on said series of adjacent and parallel vertical cross-section planes and said series of adjacent two-dimensional contours; and a multi-axis driving device for driving the cutting means so as to move in response to each two-dimensional contour of the plurality of cross-section planes.

2. An automated system according to claim 1, wherein the topographic data interpolator means can interpolate the elevation data of the topographic data into grid data points of a predetermined 3D grid, and can generate motion control codes based on said grid data points.

3. An automated system according to claim 2, wherein the cutting means is operatively connected with the multi-axis driving device so as to travel along a serpentine pattern in response to the motion control codes.

4. An automated system according to claim 2, wherein the topographic data interpolator means includes means for implementing at least one of Triangulation with Linear Interpolation, the Minimum Curvature, Shepard's method, Kriging, the Polynomial Regression, Inverse Distance to a Power, the Nearest Neighbor method, and the Radial Basis Functions method.

5. An automated system according to claim 1, wherein the topographic data interpolator means is capable of interpolating the elevation data of the topographic data into grid data points of a predetermined 3D grid, and the cutting means is operatively connected with the multi-axis driving device so as to travel along a serpentine pattern in response to the grid data points of the 3D grid.

6. An automated system according to claim 1, wherein the elevation data of the topographic data is in at least one of a 3D digital point format, 3D digital contour data format, and 2D paper contour data format.

7. An automated system according to claim 1, wherein elevation data of the three dimensional topographic data is in a 3D digital contour data format, the topographic data interpolator means is capable of interpolating the 3D digital contour format into grid data points of a predetermined 3D grid, and generating motion control codes based on said grid data points.

8. An automated system according to claim 1, wherein the elevation data of the three dimensional topographic data is in a 2D paper contour data format, the topographic data interpolator means is capable of digitizing the 2D paper contour data format so as to generate a 3D digital point data.

9. An automated system according to claim 8, further comprising a mechanical arm for tracing contours shown in the 2D paper contour data format, and means for recording the 3D digital points that fall on the contours.

10. An automated system according to claim 1, wherein the multi-axis driving device includes at least one friction-reducing means for facilitating free movement in a single axis.

11. An automated system according to claim 10, wherein the friction-reducing means is at least one of tongue-in-groove guide, a guide bearing and a guide roller.

12. An automated system according to claim 1, wherein the multi-axis driving device includes one horizontal guide means moving in a first direction and a second horizontal guide means moving in a second direction perpendicular to said first direction.

13. An automated system according to claim 1, wherein the cutting means is operatively connected to the multi-axis driving device so as to remove unwanted cross-sections of material from the object along the two-dimensional contours of the plurality of cross-section planes.

14. An automated system according to claim 1, wherein the driving device includes means for determining motion paths and speeds for the cutting means in response to the two-dimensional contours of the cross-section planes.

15. An automated system according to claim 1, wherein the driving device includes means for determining motion paths and speeds for the cutting means in response to the motion control codes.

16. An automated system according to claim 15, wherein the determining means determines the motion paths and speeds for the cutting means in response to input information including a size of the cutting means, a material of the cutting means and a material of the object to be cut.

17. An automated system according to claim 16, wherein the determining means determines the motion paths and speeds for the cutting means in response to input information including a selected scale of the terrain to be made into the model.

18. An automated system according to claim 15, wherein the determining means determines at least one of abnormalities and errors in the motion control codes and in input information so as to detect inconsistent parameters, radical changes in data or data errors.

19. An automated system according to claim 18, wherein the determining means determines at least one of abnormalities and errors in the motion control codes and in input information so as to reconcile inconsistent parameters, radical changes in data or data errors.

20. An automated system according to claim 18, wherein said determining means is operatively connected to generate warning signals to a user in response to detecting abnormalities and errors.

21. An automated system according to claim 1, wherein the multi-axis driving device includes a stepper motor.

22. An automated system according to claim 21, wherein the multi-axis driving device further includes a stepper motor-driven lead-screw per axis, and the cutting means is affixed to and operative from one of the lead-screws.

23. An automated system according to claim 1, wherein the cutting means includes a rotating cutting device.

24. An automated system according to claim 23, wherein the rotating cutting device includes a drill.

25. An automated system according to claim 1, wherein the cutting means includes a fluted end milling tool.

26. An automated system according to claim 1, wherein the cutting means includes multiple cuttings moving at different paths and speeds.

27. An automated system according to claim 26, wherein the multiple cutters include a primary cutter moving along a rough translation of the two-dimensional contour to remove unwanted material from the object, and an auxiliary cutter moving along the two-dimensional contour to cut fine details for the model.

28. An automated system according to claim 27, wherein the auxiliary cutter is operatively positioned with the primary cutter so as to move along the two-dimensional contour in conjunction with the primary cutter moving along the rough translation of the two-dimensional contour.

29. An automated system according to claim 27, wherein the primary cutter has a large diameter end milling tool with a flat bottom and straight sides, and the auxiliary cutter has an end milling tool with tapered sides.

30. An automated system according to claim 1, wherein the object to be cut is made from at least one of hi-density foam, wood, metal and plastic.

31. An automated system according to claim 1, wherein the cutting means supplies heat, laser, or plasma to cut the object.

32. An automated system according to claim 1, wherein the cutting means applies an abrasive or erosive material on the object.

33. An automated system according to claim 1, wherein the cutting means includes an Electric Discharge Machining (EDM) device.

34. A high-accuracy three dimensional cutting apparatus for duplication terrain into a hi-accuracy three-dimensional topographic model, comprising:
  a data translator for translating topographic and cartographic data of the terrain into a series of adjacent and parallel vertical cross-section planes of the topographic model and sequentially to a series of adjacent two-dimensional contours along each of such cross-section planes;
  at least one milling device for milling an object so as to duplicate the terrain into the hi-accuracy three-dimensional topographic model; and
  a multi-axis driving device with the milling device being operatively mounted so as to move in response to the series of adjacent two-dimensional contours.

35. A hi-accuracy three-dimensional cutting apparatus for duplication terrain into a hi-accuracy three-dimensional topographic model, comprising:
- a computer;
- a multi-axis cutting machine for cutting an object into a hi-accuracy three-dimensional topographic model, the cutting machine having a cutting tool for cutting material from the object and a driving device for driving the cutting tool in multiple axes in and around the object to be cut; and
- a computer readable medium containing an algorithm for converting the topographic and cartographic data of the terrain into a series of adjacent and parallel vertical cross-section planes of the topographic model and sequentially to a series of adjacent two dimensional contours in each of the cross-section planes, and an algorithm for controlling the multi-axis cutting machine.

36. A cutting apparatus according to clam 35, wherein the computer readable medium includes an algorithm for interpolating the topographic and cartographic data of the terrain into grid data points of a predetermined 3D grid, and an algorithm for generating motion control codes based on said grid data points.

37. A cutting apparatus according to claim 36, wherein the computer readable medium includes an algorithm for interpolating the topographic and cartographic data of the terrain into grid data points of a predetermined 3D grid, and the cutting machine is operatively controlled by operation of the computer readable medium so as to move the cutting tool along a serpentine pattern in response to the grid data points of the 3D grid.

38. A cutting apparatus according to claim 36, wherein the cutting machine is operatively controlled by operation of the computer readable medium so as to move the cutting tool along a serpentine pattern in response to the motion control codes.

39. A cutting apparatus according to claim 36, wherein the interpolating means includes means for implementing at least one of Triangulation with Linear Interpolation, the Minimum Curvature, Shepard's method, Kriging, the Polynomial Regression, Inverse Distance to a Power, the Nearest Neighbor method, and the Radial Basis Functions method.

40. A cutting apparatus according to claim 36, wherein the driving device includes means for determining motion paths and speeds for the cutting machine in response to the motion control codes.

41. A cutting apparatus according to claim 40, wherein said determining means being further for determining the motion paths and speeds for the cutting machine in response to input information including a size of the cutting tool, a material of the cutting tool and a material of the object to be cut.

42. A cutting apparatus according to claim 41, wherein said determining means being further for determining the motion paths and speeds for the cutting machine in response to input information including a selected scale of the terrain to be made into the model.

43. A cutting apparatus according to claim 41, wherein said determining means being further for determining at least one of abnormalities and errors in the motion control codes and in input information so as to detect inconsistent parameters, radical changes in data or data errors.

44. A cutting apparatus according to claim 43, wherein said determining means being further for determining at least one of abnormalities and errors in the motion control codes and in input information so as to reconcile inconsistent parameters, radical changes in data or data errors.

45. A cutting apparatus according to claim 44, wherein said determining means is operatively connected to generate warning signals to a user in response to detecting abnormalities and errors.

46. A cutting apparatus according to claim 35, wherein the topographic data of the terrain is in at least one of a 3D digital point format, 3D digital contour data format, and 2D paper contour data format.

47. A cutting apparatus according to claim 35, wherein the topographic data of the terrain is in a 3D digital contour data format, the computer readable medium including an algorithm for interpolating the 3D digital contour data format into grid data points of a predetermined 3D grid, and an algorithm for generating motion control codes based on said grid data points.

48. A cutting apparatus according to claim 35, wherein the topographic data of the terrain is in a 2D paper contour data format, the computer readable medium including a digitizing device for digitizing the 2D paper contour data format so as to generate 3D digital point data.

49. A cutting apparatus according to claim 48, wherein the digitizing device includes a mechanical arm for tracing contours shown in the 2D paper contour data format, and means for recording the 3D digital points that fall on the contours.

50. A cutting apparatus according to claim 35, wherein the multi-axis cutting machine includes one horizontal guide element moving in a first direction and a second horizontal guide element moving in a second direction perpendicular to said first direction.

51. A cutting apparatus according to claim 35, wherein the cutting tool is operatively connected to the multi-axis cutting machine so as to remove unwanted cross-sections of material from the object along the two-dimensional contours of the plurality of cross-section planes.

52. A cutting apparatus according to claim 35, wherein the computer readable medium includes an algorithm for determining motion paths and speeds for the cutting machine in response to the two-dimensional contours of the cross-section planes.

53. A cutting apparatus according to claim 35, wherein the cutting tool includes multiple cutters moving at different paths and speeds.

54. A cutting apparatus according to claim 53, wherein the multiple cutters include a primary cutter moving along a rough translation of the two-dimensional contour to remove unwanted material from the object, and an auxiliary cutter moving along the two-dimensional contour to cut fine details for the model.

55. A cutting apparatus according to claim 54, wherein the auxiliary cutter is operatively positioned with the primary cutter so as to move along the two-dimensional contour in conjunction with the primary cutter moving along the rough translation of the two-dimensional contour.

56. A cutting apparatus according to claim 54, wherein the primary cutter has a large diameter end milling tool with a flat bottom and straight sides, and the auxiliary cutter has an end milling tool with tapered sides.

57. A computer program product for controlling a high-accuracy three-dimensional cutting apparatus for duplicating terrain into a hi-accuracy three-dimensional topographic model, comprising:
- a data translating module for translating the topographic and cartographic data of the terrain into a series of adjacent and parallel vertical cross-section planes of the terrain to be modeled and sequentially to a series of adjacent two-dimensional contours within each of the cross-section planes;

a cutting module for controlling a cutting device formed to cut an object so as to duplicate the terrain into the hi-accuracy three-dimensional topographic model; and a multi-axis driving module for controlling a driving device operatively connected to the cutting device so as to move the cutting device along the two-dimensional contour of each of the cross-section planes.

58. A computer program product according to claim 57, wherein the data translating module includes a model for interpolating the topographic and cartographic data of the terrain into grid data points of a predetermined 3D grid, and means for generating motion control codes based on said grid data points.

59. A computer program product according to claim 58, wherein the cutting module is operatively formed to drive the driving device so as to travel along a serpentine pattern in response to the motion control codes.

60. A computer program product according to claim 58, wherein the interpolating module includes a module for implementing at least one of Triangulation with Linear Interpolation, the Minimum Curvature, Shepard's method, Kriging, the Polynomial Regression, Inverse Distance to a Power, the Nearest Neighbor method, and the Radial Basis Functions method.

61. A computer program product according to claim 57, wherein the data translating module includes a module for interpolating the topographic and cartographic data of the terrain into grid data points of a predetermined 3D grid, and the cutting module is operatively formed to drive the driving device to travel along a serpentine pattern in response to the grid data points of the 3D grid.

62. A computer program product according to claim 57, wherein the topographic data of the terrain is in at least one of a 3D digital point format, 3D digital contour data format, and 2D paper contour data format.

63. A computer program product according to claim 57, wherein the topographic data of the terrain is in a 3D digital contour data format, the data translation module including a module for interpolating the 3D digital contour data format into grid data points of a predetermined 3D grid, and a module for generating motion control codes based on said grid data points.

64. A computer program product according to claim 57, wherein the topographic data of the terrain is in a 2D paper contour data format, the data translator including a module for digitizing the 2D paper contour data format so as to generate 3D digital point data.

65. A computer program product according to claim 57, wherein the driving module includes a module for determining motion paths and speeds for the cutting device in response to the two-dimensional contours of the cross-section planes.

66. A computer program product according to claim 65, wherein the determining module determines the motion paths and speeds for the cutting device in response to input information including a size of the cutting device, a material of the cutting device and a material of the object to be cut.

67. A computer program product according to claim 57, wherein the driving module includes a module for determining motion paths and speeds for the cutting device in response to the motion control codes.

68. A computer program product according to claim 67, wherein the determining module determines the motion paths and speeds for the cutting device in response to input information including a selected scale of the terrain to be made into the model.

69. A computer program product according to claim 67, wherein the determining module determines at least one of abnormalities and errors in the motion control codes and input information so as to detect inconsistent parameters, radical changes in data or data errors.

70. A computer program product according to claim 69, wherein the determining module determines at least one of abnormalities and errors in the motion control codes and in input information so as to reconcile inconsistent parameters, radical changes in data or data errors.

71. A computer program product according to claim 69, wherein said determining module is operatively connected to generate warning signals to a user in response to detecting abnormalities and errors.

72. A computer-implemented method for duplication terrain into a hi-accuracy three-dimensional topographic model, comprising:

providing a computer and a multi-axis cutting device;

translating via the computer topographic and cartographic data of the terrain into a series of adjacent and parallel vertical cross-section planes of the topographic model and sequentially to a series of adjacent two-dimensional contours within each of the cross-section planes; and driving a multi-axis cutting device to cut an object in response to the two-dimensional contours of the cross-section planes so as to duplicate the terrain into the hi-accuracy three-dimensional topographic model.

73. A method according to claim 72, wherein the step of translating includes interpolating the topographic and cartographic data of the terrain into grid data points of a predetermined 3D grid, and generating motion control codes based on said grid data points.

74. A method according to claim 73, wherein the step of driving the cutting device includes cutting the object along a serpentine pattern in response to the motion control codes.

75. A method according to claim 73, wherein the step of interpolating includes implementing at least one of Triangulation with Linear Interpolation, the Minimum Curvature, Shepard's method, Kriging the Polynomial Regression, Inverse Distance to a Power, the Nearest Neighbor method, and the Radial Basis Functions method.

76. A method according to claim 72, wherein the step of translating includes interpolating the topographic and cartographic data of the terrain into grid data points of a predetermined 3D grid, and the step of driving the cutting device includes cutting the object along a serpentine pattern in response to the grid data points of the 3D grid.

77. A method according to claim 76, wherein the topographic data of the terrain is in a 2D paper contour data format, the step of translating including digitizing the 2D paper contour data format so as to generate 3D digital point data.

78. A method according to claim 76, wherein the step of driving the cutting device includes removing unwanted cross-sections of material from the object along the two-dimensional contours of the plurality of cross-section planes.

79. A method according to claim 72, wherein the topographic data of the terrain is in at least one of a 3D digital point format, 3D digital contour data format, and 2D paper contour data format.

80. A method according to claim 72, wherein the topographic data of the terrain is in a 3D digital contour data format, the step of translating including interpolating the 3D digital contour data format into grid data points of a predetermined 3D grid, and generating motion control codes based on said grid data points.

81. A method according to claim 72, wherein the step of driving the cutting device includes determining motion paths and speeds for the cutting means in response to the two-dimensional contours of the cross-section planes.

82. A method according to claim 72, wherein the step of driving the cutting device includes determining motion paths and speeds for the cutting device in response to the motion control codes.

83. A method according to claim 82, wherein the step of determining includes determining the motion paths and speeds for the cutting device in response to input information including a size of the cutting device, a material of the cutting device and a material of the object to be cut.

84. A method according to claim 82, wherein the step of determining includes determining the motion paths and speeds for the cutting device in response to input information including a selected scale of the terrain to be made into the model.

85. A method according to claim 84, wherein the step of determining includes determining at least one of abnormalities and errors in the motion control codes and in input information so as to detect inconsistent parameters, radical changes in data or data errors.

86. A method according to claim 84, wherein the determining step includes determining at least one of abnormalities and errors in the motion control codes and in input information so as to reconcile inconsistent parameters, radical changes in data or data errors.

87. A method according to claim 84, wherein said determining step includes generating warning signals to a user in response to detecting abnormalities and errors.

88. A method according to claim 72, wherein the step of driving the cutting device includes driving multiple cutters moving at different paths and speeds.

89. A method according to claim 88, wherein the driving step further includes driving a primary cutter moving along a rough translation of the two-dimensional contour to remove unwanted material from the object, and an auxiliary cutter moving along the two-dimensional contour to cut fine details for the model.

90. A method according to claim 89, wherein the driving step further includes driving the auxiliary cutter so as to move along the two-dimensional contour in conjunction with the primary cutter moving along the rough translation of the two-dimensional contour.

91. An automated system for producing a hi-accracy three-dimensional topographical map based on three-dimensional topographical data pertaining to an actual geographical area, comprising:

data convertor means for converting said data pertaining to an actual geographical area into a 3D topgraphical map scale in accordance with data pertaining to the scale of cartographic image content;

topographic-data translator means for translating said data pertaining to the three-dimensional topography of an actual geographical area and said 3D topographical map scale into a series of adjacent and parallel vertical cross-section planes and a series of adjacent two-dimensional contours wherein each plane of said series of cross-section planes incorporates one contour of said series of adjacent two-dimensional contours;

cutting means for cutting said hi-accuracy 3D topographical map based on said series of adjacent and parallel vertical cross-section planes and said series of adjacent two-dimensional contours; and a multi-axis driving device for driving the cutting means so as to move in response to each two-dimensional contour of the plurality of cross-section planes.

* * * * *